(12) United States Patent
Kato et al.

(10) Patent No.: US 7,727,615 B2
(45) Date of Patent: *Jun. 1, 2010

(54) PRESSURE-SENSITIVE ADHESIVE SHEET

(75) Inventors: Kiichiro Kato, Warabi (JP); Kazuhiro Tsuda, Warabi (JP); Yumiko Matsubayashi, Warabi (JP)

(73) Assignee: Lintec Corporation, Tokyo (JP)

( * ) Notice: Subject to any disclaimer, the term of this patent is extended or adjusted under 35 U.S.C. 154(b) by 595 days.

This patent is subject to a terminal disclaimer.

(21) Appl. No.: 11/629,214

(22) PCT Filed: Jun. 8, 2005

(86) PCT No.: PCT/JP2005/010510

§ 371 (c)(1),
(2), (4) Date: Feb. 8, 2007

(87) PCT Pub. No.: WO2005/121268

PCT Pub. Date: Dec. 22, 2005

(65) Prior Publication Data

US 2008/0090049 A1  Apr. 17, 2008

(30) Foreign Application Priority Data

Jun. 14, 2004  (JP) .............................. 2004-176023

(51) Int. Cl.
B32B 3/24  (2006.01)

(52) U.S. Cl. ...................... 428/137; 428/40.1; 428/343

(58) Field of Classification Search ................. 428/137, 428/343, 40.1
See application file for complete search history.

(56) References Cited

U.S. PATENT DOCUMENTS 3,085,024 A  4/1963  Blackford (Continued)

FOREIGN PATENT DOCUMENTS

EP  1 577 358 A1  9/2005

(Continued)

OTHER PUBLICATIONS

International Search Report for corresponding International application No. PCT/JP2005/010510 dated Oct. 4, 2005.

(Continued)

Primary Examiner—William P Watkins, III
(74) Attorney, Agent, or Firm—Posz Law Group, PLC (57) ABSTRACT

To provide a pressure-sensitive adhesive sheet according to which air entrapment and blistering can be prevented or eliminated via through-holes, and yet the appearance compares favorably with that of a pressure-sensitive adhesive sheet having no through-holes therein, as a substrate 11 there is used one having a surface roughness (Ra) of not less than 0.03 μm, a lightness (L*) in the L*a*b* color system of not more than 60 in the case of having a chroma (C*) of not more than 60 and a lightness (L*) of not more than 85 in the case of having a chroma (C*) greater than 60, and a contrast ratio of not less than 90%, through-holes 2 passing through the substrate 11 and a pressure-sensitive adhesive layer 12 are made to have a diameter in the substrate 11 and the pressure-sensitive adhesive layer 12 of from 0.1 to 200 μm, a diameter at a surface of the substrate 11 of from 0.1 to 42 μm, and a hole density of from 30 to 50,000 per 100 cm², in the case that melted portions formed by a laser are present around the through-holes 2 at the surface of the substrate 11, the melted portions are made to have an outside diameter of not more than 50 μm, and in the case that thermally deformed portions are present around the through-holes 2 at the surface of the substrate 11, the thermally deformed portions are made to have an outside diameter of not more than 180 μm.

3 Claims, 4 Drawing Sheets

U.S. PATENT DOCUMENTS

| | | | |
|---|---|---|---|
| 5,275,856 | A | 1/1994 | Calhoun et al. |
| 5,810,756 | A | 9/1998 | Montecalve et al. |
| 5,993,961 | A | 11/1999 | Ugolick et al. |
| 6,503,620 | B1 | 1/2003 | Xie et al. |
| 6,509,076 | B1 | 1/2003 | Otaki et al. |
| 6,627,844 | B2 * | 9/2003 | Liu et al. ............... 219/121.71 |
| 2001/0053648 | A1 | 12/2001 | Furukawa et al. |
| 2001/0055928 | A1 | 12/2001 | Eevers et al. |
| 2003/0192638 | A1 | 10/2003 | Yang et al. |
| 2006/0083894 | A1 | 4/2006 | Vetrovec et al. |
| 2006/0222813 | A1 | 10/2006 | Kato et al. |
| 2007/0227653 | A1 | 10/2007 | Tsuda et al. |
| 2007/0254136 | A1 | 11/2007 | Kato et al. |
| 2008/0032118 | A1 | 2/2008 | Kato et al. |

FOREIGN PATENT DOCUMENTS

| | | | |
|---|---|---|---|
| EP | 1 719 807 A1 | | 11/2006 |
| EP | 1 767 605 A1 | | 3/2007 |
| EP | 1 767 606 A1 | | 3/2007 |
| JP | A-01-125345 | | 8/1989 |
| JP | 02107682 A | * | 4/1990 |
| JP | 4-55489 | | 2/1992 |
| JP | U-04-100235 | | 8/1992 |
| JP | 2003-183602 | | 7/2003 |
| JP | 2003183602 A | * | 7/2003 |
| JP | A-2003-342533 | | 12/2003 |
| JP | A-2005-075953 | | 3/2005 |
| WO | WO 01/51580 | | 7/2001 |
| WO | WO 2004/061032 A1 | | 7/2004 |
| WO | WO 2005/123859 A1 | | 12/2005 |
| WO | WO 2005/123860 A1 | | 12/2005 |

OTHER PUBLICATIONS

Communication issued from the European Patent Office on Feb. 10, 2009 for the corresponding European patent application No. 05748622.7—2102.

International Search Report of the International Searching Authority mailed on Apr. 26, 2005 for the corresponding International patent application No. PCT/JP2005/002732 in related U.S. Appl. No. 10/590,514.

Chinese Office Action issued from the Chinese Patent Office on Jan. 16, 2009 for the corresponding Chinese patent application No. 2005800060815 in related U.S. Appl. No. 10/590,514.

Supplementary European Search Report issued from the European Patent Office on Feb. 5, 2009 for the corresponding European patent application No. 05719351.8 in related U.S. Appl. No. 10/590,514.

Office Action mailed May 26, 2009 in related U.S. Appl. No. 10/590,514.

Final Office Action mailed Dec. 8, 2009 in related U.S. Appl. No. 10/590,514.

Office Action issued on Mar. 24, 2010 in related U.S. Appl. No. 10/590,514.

* cited by examiner

Fig.5

PRESSURE-SENSITIVE ADHESIVE SHEET

CROSS REFERENCE TO RELATED APPLICATIONS

This application is a U.S. national stage application of PCT/JP2005/010510 filed on Jun. 8, 2005, and claims priority to, Japan patent application No. 2004-176023 filed on Jun. 14, 2004. This application is also related to U.S. application Ser. No. 10/590,514, entitled "PRESSURE-SENSITIVE ADHESIVE SHEET," filed on Aug. 24, 2006.

TECHNICAL FIELD

The present invention relates to a pressure-sensitive adhesive sheet according to which air entrapment and blistering can be prevented or eliminated.

BACKGROUND

When sticking a pressure-sensitive adhesive sheet onto an adherend by hand, entrapment of air between the adherend and the pressure-sensitive adhesive surface may occur, marring the appearance of the pressure-sensitive adhesive sheet. Such air entrapment is particularly prone to occur in the case that the pressure-sensitive adhesive sheet has a large area.

To eliminate problems with appearance of a pressure-sensitive adhesive sheet due to air entrapment, another pressure-sensitive adhesive sheet may be stuck on in place of the preceded pressure-sensitive adhesive sheet, or the attached pressure-sensitive adhesive sheet may be peeled off and then reattached, or a hole may be made with a needle in a blistered portion of the pressure-sensitive adhesive sheet so as to allow the air to escape. However, in the case of sticking on in place of pressure-sensitive adhesive sheet, effort is required, and furthermore the cost is increased; moreover, in the case of reattaching the original pressure-sensitive adhesive sheet, problems often arise such as the pressure-sensitive adhesive sheet tearing, or wrinkles forming on the surface, or the adhesiveness dropping. On the other hand, the method of making a hole with a needle mars the appearance of the pressure-sensitive adhesive sheet.

To prevent air entrapment from occurring, there is a method in which water is put onto the adherend or the pressure-sensitive adhesive surface in advance before the two are stuck together; however, in the case of sticking on a pressure-sensitive adhesive sheet having large dimensions such as a safety film stuck onto a window, a decorative film or a marking film, much time and effort is required. Moreover, there is a method in which air entrapment is prevented from occurring by sticking on the pressure-sensitive adhesive sheet using a device rather than by hand; however, depending on the use of the pressure-sensitive adhesive sheet or the site or shape of the adherend, it may not be possible to use such a device for sticking on the pressure-sensitive adhesive sheet.

Meanwhile, a resin material such as an acrylic resin, an ABS resin, a polystyrene resin or a polycarbonate resin may emit a gas upon heating or even with no heating; in the case of sticking a pressure-sensitive adhesive sheet onto an adherend made of such a resin material, blistering may occur on the pressure-sensitive adhesive sheet due to the gas emitted from the adherend.

Moreover, in the case of sticking a pressure-sensitive adhesive sheet onto an adherend made of a resin through which gas readily permeates, gas that has permeated through may build up between the adherend and the pressure-sensitive adhesive sheet, so that the pressure-sensitive adhesive sheet blisters or peels off. For example, in the case that a marking sheet is stuck onto a motorbike gasoline tank made of polyethylene resin, vapor of gasoline in the gasoline tank may vaporize so as to permeate through the polyethylene resin layer of the gasoline tank, so that the marking sheet blisters or peels off, bringing about an undesirable situation such as the appearance being marred.

To solve such problems, with a pressure-sensitive adhesive sheet described in Japanese Patent Application Laid-open No. H2-107682, a substrate and a pressure-sensitive adhesive layer are subjected to punching processing using a blade die and a hole die so as to form through-holes of diameter from 0.2 to 1.0 mm therein, and with a pressure-sensitive adhesive sheet described in Japanese Utility Model Application Laid-open No. H4-100235, a substrate and a pressure-sensitive adhesive layer are subjected to perforation processing using a hot needle so as to form through-holes of diameter from 0.05 to 0.15 mm therein; air or gas escapes from these through-holes to the outside, whereby air entrapment and blistering of the pressure-sensitive adhesive sheet are prevented.

However, with the above pressure-sensitive adhesive sheets, the through-holes can be seen with the naked eye, and hence the appearance of the pressure-sensitive adhesive sheet is not necessarily good. In particular, in the case of forming the through-holes using a hot needle as with the pressure-sensitive adhesive sheet described in Japanese Utility Model Application Laid-open No. H4-100235, portions where the substrate melts and thus rises up mar the appearance of the pressure-sensitive adhesive sheet.

Moreover, with the above pressure-sensitive adhesive sheets, there has been a problem that if liquid such as water or gasoline becomes attached to the pressure-sensitive adhesive sheet after the pressure-sensitive adhesive sheet has been stuck onto an adherend, then this liquid enters into the through-holes, causing the through-hole portions (portions around the peripheries of the through-holes) to swell or the like so that the appearance of the pressure-sensitive adhesive sheet is marred.

The present invention has been devised in view of the above state of affairs; it is an object of the present invention to provide a pressure-sensitive adhesive sheet according to which air entrapment and blistering can be prevented or eliminated via through-holes, and yet the appearance compares favorably with that of a pressure-sensitive adhesive sheet having no through-holes therein.

SUMMARY OF THE INVENTION

To attain the above object, the present invention provides a pressure-sensitive adhesive sheet comprising a substrate having a surface roughness (Ra) of not less than 0.03 μm, a lightness (L*) in the L*a*b* color system of not more than 60 in the case of having a chroma (C*) of not more than 60 and a lightness (L*) of not more than 85 in the case of having a chroma (C*) greater than 60, and a contrast ratio of not less than 90%, and a pressure-sensitive adhesive layer, the pressure-sensitive adhesive sheet wherein the pressure-sensitive adhesive sheet is formed with a plurality of through-holes passing through from one surface to the other surface thereof at a hole density of from 30 to 50,000 per 100 cm² through laser processing, the through-holes have a diameter in the substrate and the pressure-sensitive adhesive layer of from 0.1 to 200 μm, the through-holes have a diameter at a surface of the substrate of from 0.1 to 42 μm, melted portions formed by the laser around the through-holes at the surface of the substrate have an outside diameter of not more than 50 μm, and thermally deformed portions formed by the laser around the through-holes or around the melted portions at the surface of the substrate have an outside diameter of not more than 180 μm (invention 1).

Note that in the present specification, "sheet" is deemed to include the idea of a film, and "film" is deemed to include the idea of a sheet. Here, "melted portion formed by the laser" means a portion where melted matter so-called "dross" formed by the laser is present, and "thermally deformed portion formed by the laser" means a convex or concave deformed portion formed around the opening of a through-hole or around a melted portion by the laser. Moreover, "melted portions . . . have an outside diameter of not more than 50 μm" is deemed to include the case that such melted portions do not exist, and "thermally deformed portions . . . have an outside diameter of not more than 180 μm" is deemed to include the case that such thermally deformed portions do not exist.

According to the pressure-sensitive adhesive sheet of the above inventions (inventions 1), air between an adherend and the pressure-sensitive adhesive surface escapes from the through-holes to the outside of the pressure-sensitive adhesive sheet front surface, and hence air tends not to be caught up when sticking the pressure-sensitive adhesive sheet to the adherend, i.e. air entrapment can be prevented from occurring. Even if air is caught up so that air entrapment occurs, by re-pressing the air-entrapped portion or an air-entrapped portion surrounding portion including the air-entrapped portion, the air can be made to escape from the through-holes to the outside of the pressure-sensitive adhesive sheet front surface, thus eliminating the air entrapment. Moreover, even if gas is emitted from the adherend after the pressure-sensitive adhesive sheet has been stuck onto the adherend, the gas will escape from the through-holes to the outside of the pressure-sensitive adhesive sheet front surface, whereby blistering can be prevented from occurring.

Moreover, according to the pressure-sensitive adhesive sheet satisfying the above conditions, none of the through-holes, melted portions or thermally deformed portions can be seen with the naked eye on the substrate surface, therefore the appearance is no different to that of a pressure-sensitive adhesive sheet having no through-holes therein.

In the case of the above invention (invention 1), in the case that the pressure-sensitive adhesive sheet is stuck onto an adherend stretched by a elongation of up to 3%, preferably, the substrate has a surface roughness (Ra) of not less than 0.1 μm, and the through-holes have a diameter in the substrate and the pressure-sensitive adhesive layer of from 0.1 to 85 μm (invention 2).

According to the pressure-sensitive adhesive sheet of the above invention (invention 2), even in the case that the pressure-sensitive adhesive sheet is stuck on stretched by a elongation of up to 3%, none of the through-holes, melted portions or thermally deformed portions can be seen with the naked eye on the substrate surface, therefore the appearance is no different to that of a pressure-sensitive adhesive sheet having no through-holes therein.

In the case of the above inventions (inventions 1 and 2), preferably, the diameter of the through-holes at the surface of the substrate is less than the diameter of the through-holes at a pressure-sensitive adhesive surface of the pressure-sensitive adhesive layer (invention 3).

According to the pressure-sensitive adhesive sheet of the present invention, air entrapment and blistering can be prevented or eliminated via through-holes, and yet the through-holes, and melted portions and thermally deformed portions which may be formed along with the through-holes, cannot be seen with the naked eye on the substrate surface, therefore the appearance is no different to that of a pressure-sensitive adhesive sheet having no through-holes therein, and thus the appearance of the pressure-sensitive adhesive sheet is very good.

DETAILED DESCRIPTION

Following is a description of an embodiment of the present invention.

[Pressure-Sensitive Adhesive Sheet]

Figure 1:
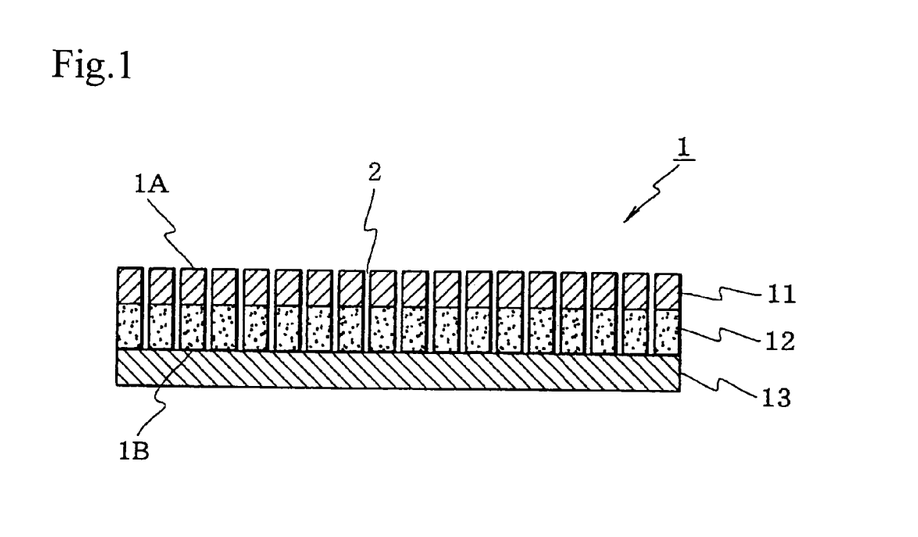
FIG. 1 is a sectional view of a pressure-sensitive adhesive sheet according to an embodiment of the present invention.

FIG. 1 is a sectional view of a pressure-sensitive adhesive sheet according to an embodiment of the present invention.

As shown in FIG. 1, the pressure-sensitive adhesive sheet 1 according to the present embodiment comprises a substrate 11, a pressure-sensitive adhesive layer 12, and a release liner 13 laminated on one another. Note, however, that the release liner 13 is peeled off when using the pressure-sensitive adhesive sheet 1.

A plurality of through-holes 2 passing through the substrate 11 and the pressure-sensitive adhesive layer 12 and thus pass from a pressure-sensitive adhesive sheet front surface 1A to a pressure-sensitive adhesive surface 1B are formed in the pressure-sensitive adhesive sheet 1. When the pressure-sensitive adhesive sheet 1 is used, air between an adherend and the pressure-sensitive adhesive surface 1B of the pressure-sensitive adhesive layer 12 and gas emitted from the adherend escape from these through-holes 2 to the outside of the pressure-sensitive adhesive sheet front surface 1A, and hence as described later, air entrapment and blistering can be prevented or eliminated.

In the present embodiment, the substrate 11 satisfies the following conditions.

(1) The surface roughness (Ra) is not less than 0.03 μm.

(2) The lightness (L*) in the L*a*b* color system is not more than 60 in the case that the chroma (C*) is not more than 60, and the lightness (L*) is not more than 85 in the case that the chroma (C*) is greater than 60.

(3) The contrast ratio is not less than 90%.

Note also that in the case that the surface roughness (Ra) is from 0.03 to 0.1 μm, the substrate 11 preferably has a modulus of elasticity in tension of not less than 180 MPa, particularly preferably not less than 200 MPa.

Here, the surface roughness (Ra: Roughness average) is in accordance with JISB0601. L*, a*, b* and C* are in accordance with JIS Z8729, the relationship between C*, a* and b* being given by $C^* = (a^{*2} + b^{*2})^{1/2}$. The contrast ratio is in accordance with JIS K5400. The modulus of elasticity in tension is in accordance with JIS K7161 and JIS K7127, being measured with a test piece (type 2) width of 15 mm, an initial inter-chuck distance of 100 mm, and a test speed of 200 mm/min.

There are no particular limitations on the material of the substrate 11 so long as this is a material that satisfies the above conditions and in which the through-holes 2 can be formed; examples include a resin film, a metal foil, paper, a resin film having metal deposited thereon by vapor deposition, paper having metal deposited thereon by vapor deposition, fabric, nonwoven fabric, or a laminate of the above. These materials may contain any of various additives such as inorganic fillers, organic fillers, and ultraviolet absorbers.

The surface of the material may have a decorative layer formed thereon by a method such as printing, painting, transfer printing, vapor deposition, or sputtering, or may have formed thereon an undercoat layer such as an adhesion facilitating coat for forming such a decorative layer, or a gloss adjusting coat, or may have formed thereon a topcoat layer such as a hard coat, an antifouling coat, or a surface roughness or specular gloss adjusting coat. Moreover, such a decorative layer, undercoat layer or topcoat layer may be formed over the whole of the material, or may be formed on only part of the material.

As a resin film, there can be used, for example, a film or a foamed film made of a resin such as a polyolefin such as polyethylene or polypropylene, a polyester such as polyethylene terephthalate or polybutylene terephthalate, polyvinyl chloride, polystyrene, a polyurethane, a polycarbonate, a polyamide, a polyimide, polymethyl methacrylate, polybutene, polybutadiene, polymethylpentene, an ethylene-vinyl acetate copolymer, an ethylene-(meth)acrylic acid copolymer, an ethylene-(meth)acrylate ester copolymer, an ABS resin, or an ionomer resin, or a thermoplastic elastomer containing a component such as a polyolefin, a polyurethane, polystyrene, polyvinyl chloride or a polyester, or a laminated film of the above. As the resin film, a commercially available one may used, or one formed by a casting method or the like using a casting sheet may be used. Moreover, as paper, for example, woodfree paper, glassine paper, coated paper, laminated paper, dust-free paper, or Japanese paper can be used.

There are no particular limitations on the above casting sheet, for example, any of various types of paper, or a resin film such as polyethylene terephthalate, polypropylene, polyethylene or the like that has been subjected to release treatment with a release agent of a silicone type, a polyester type, an acrylic type, an alkyd type, a urethane type or the like or a synthetic resin can be used. The thickness of the casting sheet is generally approximately 10 to 200 μm, preferably approximately 25 to 150 μm.

The thickness of the substrate 11 is generally approximately from 1 to 500 μm, preferably from 3 to 300 μm, but may be changed as appropriate in accordance with the use of the pressure-sensitive adhesive sheet 1.

There are no particular limitations on the type of the pressure-sensitive adhesive constituting the pressure-sensitive adhesive layer 12 so long as the through-holes 2 can be formed therein; the pressure-sensitive adhesive may be any of an acrylic type, a polyester type, a polyurethane type, a rubber type, a silicone type, or the like. Moreover, the pressure-sensitive adhesive may be any of an emulsion type, a solvent type, or a solvent-less type, and may be either a crosslinked type or a non-crosslinked type.

The thickness of the pressure-sensitive adhesive layer 12 is generally approximately from 1 to 300 μm, preferably from 5 to 100 μm, but may be changed as appropriate in accordance with the use of the pressure-sensitive adhesive sheet 1.

There are no particular limitations on the material of the release liner 13; for example, a film or foamed film made of a resin such as polyethylene terephthalate, polypropylene or polyethylene, or paper such as glassine, coated paper or laminated paper that has been subjected to release treatment with a release agent such as a silicone type one, a fluorine type one or a long chain alkyl group-containing carbamate can be used.

The thickness of the release liner 13 is generally approximately from 10 to 250 μm, preferably approximately from 20 to 200 μm. Moreover, the thickness of the release agent in the release liner 13 is generally from 0.05 to 5 μm, preferably from 0.1 to 3 μm.

The through-holes 2 passing through the substrate 11 and the pressure-sensitive adhesive layer 12 are formed through laser processing, described below. Through the laser processing, minute through-holes with good air escaping ability can easily be formed at a desired hole density.

In the present embodiment, the through-holes 2 have a diameter in the substrate 11 and the pressure-sensitive adhesive layer 12 of from 0.1 to 200 μm, preferably from 0.1 to 150 μm, and a diameter at the surface of the substrate 11 of from 0.1 to 42 μm, preferably from 0.1 to 40 μm.

Figure 2:
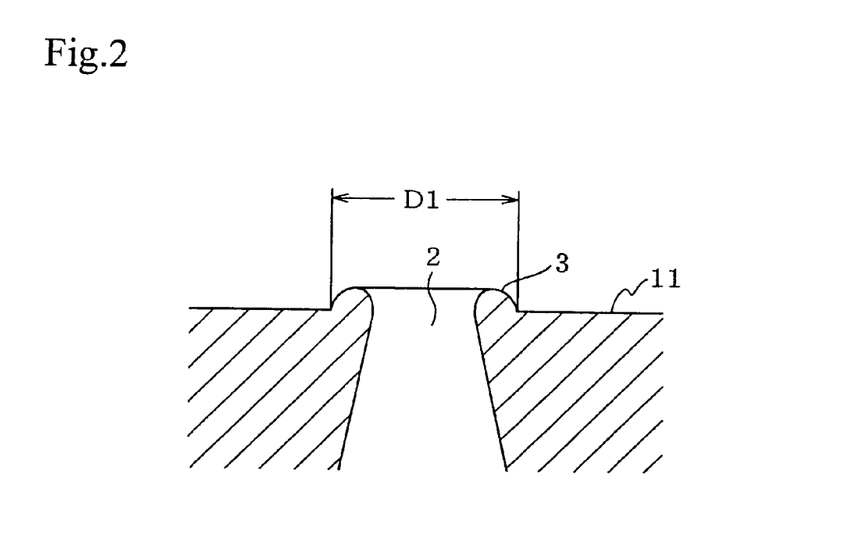
FIG. 2 is a sectional view showing the shape of a melted portion.

Moreover, depending on the material of the substrate 11 and the type of the laser, melted matter (dross) may be formed around the openings of the through-holes 2 through the laser processing as shown in FIG. 2; in this case, each portion (melted portion) 3 where the melted matter is present has an outside diameter D1 at the surface of the substrate 11 of not more than 50 μm, preferably not more than 45 μm. The melted matter generally has a height of not more than 10 μm, preferably not more than 7 μm.

Figure 3:
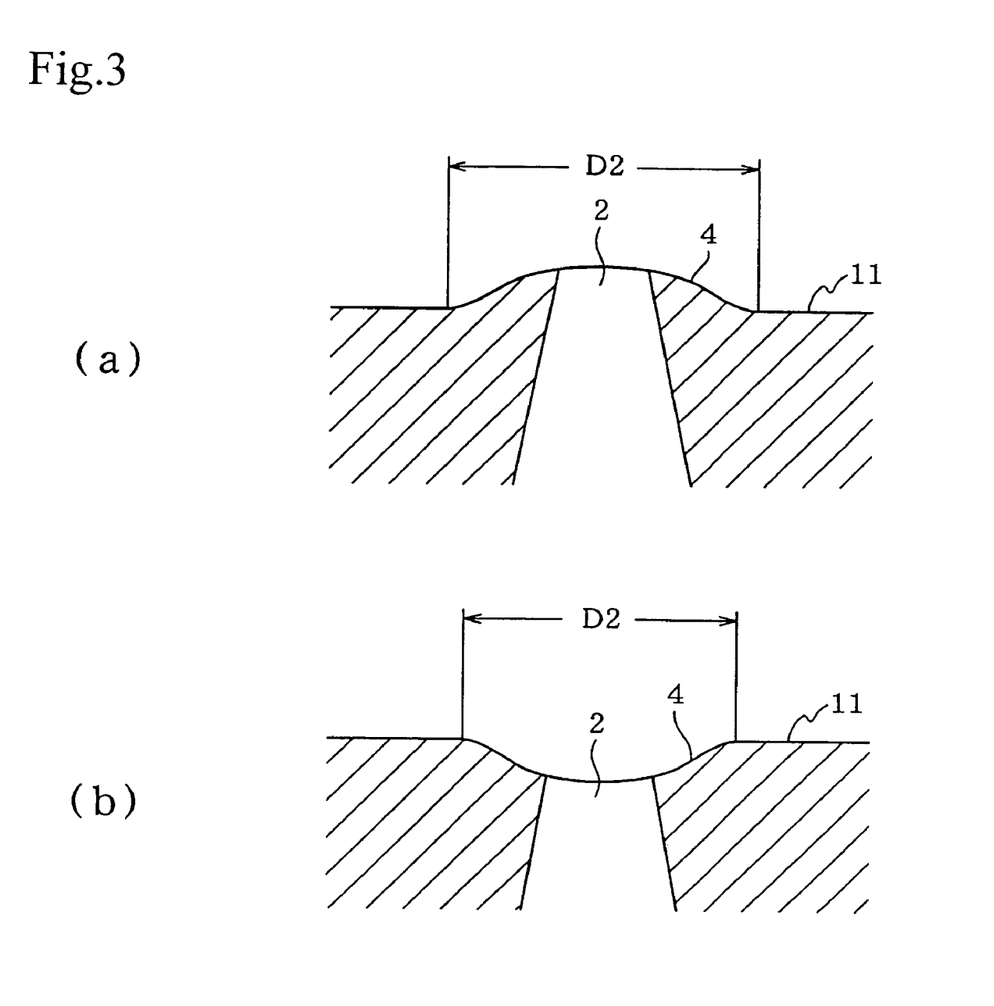
FIG. 3 consists of sectional views showing shapes of thermally deformed portions.

Furthermore, depending on the material of the substrate 11 and the type of the laser, convex or concave thermally deformed portions 4 may be formed around the openings of the through-holes 2 or around the melted portions 3 through the laser processing as shown in FIGS. 3(a) and (b); in the case that such thermally deformed portions 4 are present, each thermally deformed portion 4 has an outside diameter D2 at the surface of the substrate 11 of not more than 180 μm, preferably not more than 160 μm. The thermally deformed portions 4 generally have a height or depth of not more than 15 μm, preferably not more than 8 μm.

Through the diameter of the through-holes 2, and the outside diameter of any melted portions 3 and thermally deformed portions 4 satisfying the above conditions, air or gas can readily escape from the through-holes 2, and moreover under the conditions on the substrate 11 described earlier, the through-holes 2, melted portions 3 and thermally deformed portions 4 cannot be seen with the naked eye on the pressure-sensitive adhesive sheet front surface 1A.

For the through-holes 2, melted portions 3 and thermally deformed portions 4 to be yet more assuredly invisible on the pressure-sensitive adhesive sheet front surface 1A, the substrate 11 preferably satisfies the following conditions.

(1) The surface roughness (Ra) is not less than 0.1 μm, particularly preferably not less than 0.14 μm.

(2) The lightness (L*) in the L*a*b* color system is not more than 55 in the case that the chroma (C*) is not more than 60, and the lightness (L*) is not more than 80 in the case that the chroma (C*) is greater than 60.

(3) The contrast ratio is not less than 95%.

Moreover, in the case that the pressure-sensitive adhesive sheet 1 is stuck onto an adherend stretched by a elongation of up to 3%, preferably, the substrate 11 has a surface roughness (Ra) of not less than 0.1 μm, and the through-holes 2 have a diameter in the substrate 11 and the pressure-sensitive adhesive layer 12 of from 0.1 to 85 μm. Through the surface roughness (Ra) of the substrate 11 and the diameter of the through-holes 2 further satisfying the above conditions, the through-holes 2 cannot be seen with the naked eye on the pressure-sensitive adhesive sheet front surface 1A even in the case that the pressure-sensitive adhesive sheet 1 is stuck on stretched by a elongation of up to 3%.

The diameter of the through-holes 2 may be constant in the thickness direction of the pressure-sensitive adhesive sheet 1, or may change in the thickness direction of the pressure-sensitive adhesive sheet 1. Examples of patterns with which the diameter of the through-holes 2 may change in the thickness direction of the pressure-sensitive adhesive sheet 1 include the various patterns shown in FIGS. 4(*a*) to (*d*).

Figure 4:
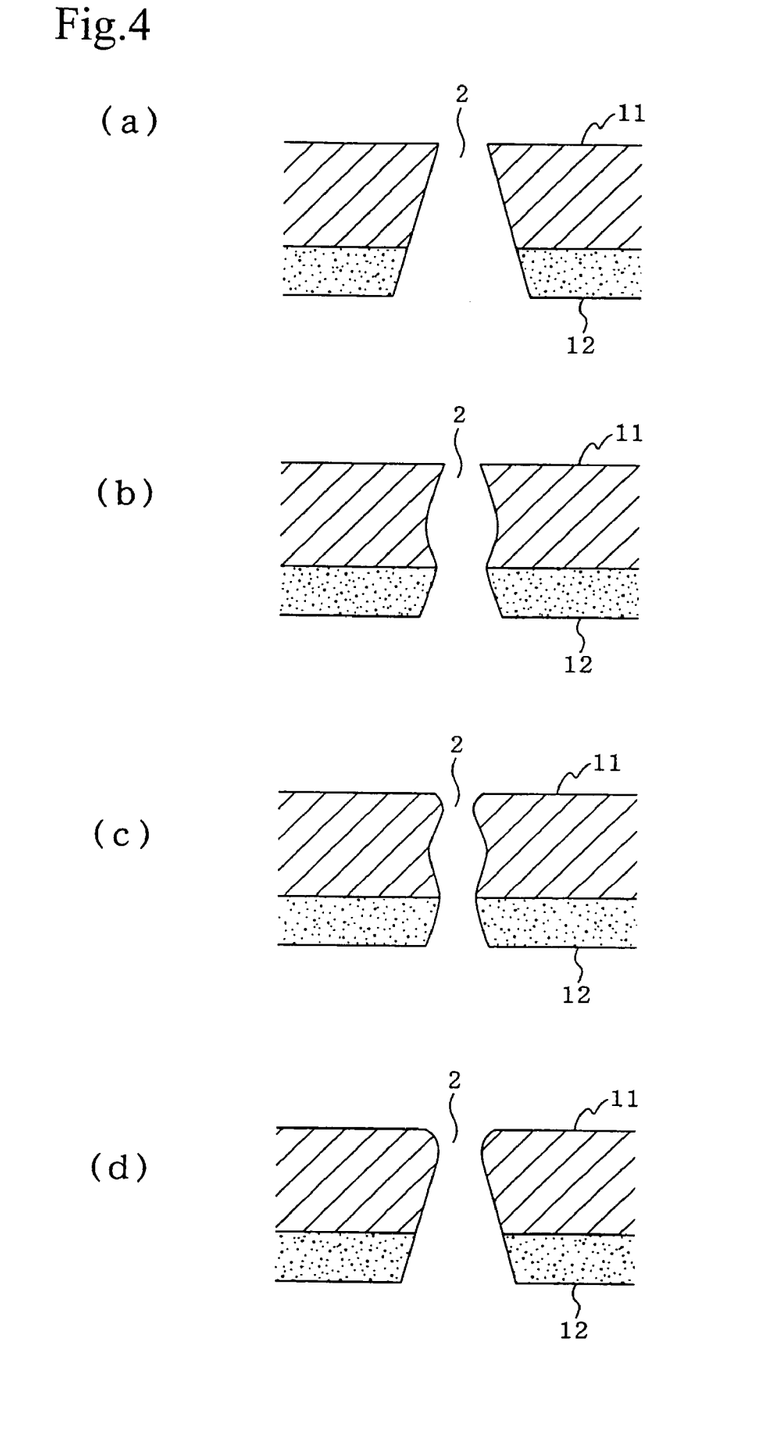
FIG. 4 consists of sectional views showing various shapes of through-holes.

In the case that the diameter of the through-holes 2 changes in the thickness direction of the pressure-sensitive adhesive sheet 1, the diameter of the through-holes 2 at the surface of the substrate 11 is preferably smaller than the diameter of the through-holes 2 at the pressure-sensitive adhesive surface 1B. Through the diameter of the through-holes 2 changing in this way, the through-holes 2 become yet less visible at the pressure-sensitive adhesive sheet front surface 1A.

The hole density of the through-holes 2 is in a range of 30 to 50,000 per 100 $cm^2$, preferably 100 to 10,000 per 100 $cm^2$. If the hole density of the through-holes 2 is less than 30 per 100 $cm^2$, then it will be difficult for air or gas to escape, whereas if the hole density of the through-holes 2 is greater than 50,000 per 100 $cm^2$, then the mechanical strength of the pressure-sensitive adhesive sheet 1 will drop.

Note that the through-holes 2 in the pressure-sensitive adhesive sheet 1 according to the present embodiment pass through only the substrate 11 and the pressure-sensitive adhesive layer 12, but the through-holes 2 may also pass through the release liner 13.

Moreover, the pressure-sensitive adhesive sheet 1 according to the present embodiment has the release liner 13, but there is no limitation to this in the present invention; the pressure-sensitive adhesive sheet 1 may have no release liner 13. Furthermore, there are no particular limitations on the size, shape and soon of the pressure-sensitive adhesive sheet 1 according to the present embodiment. For example, the pressure-sensitive adhesive sheet 1 may be a tape comprising only the substrate 11 and the pressure-sensitive adhesive layer 12 (a pressure-sensitive adhesive tape), and may also be wound up into a roll.

[Production of Pressure-Sensitive Adhesive Sheet]

An example of a method of producing the pressure-sensitive adhesive sheet 1 according to the above embodiment will now be described with reference to FIGS. 5(*a*) to (*f*).

Figure 5:
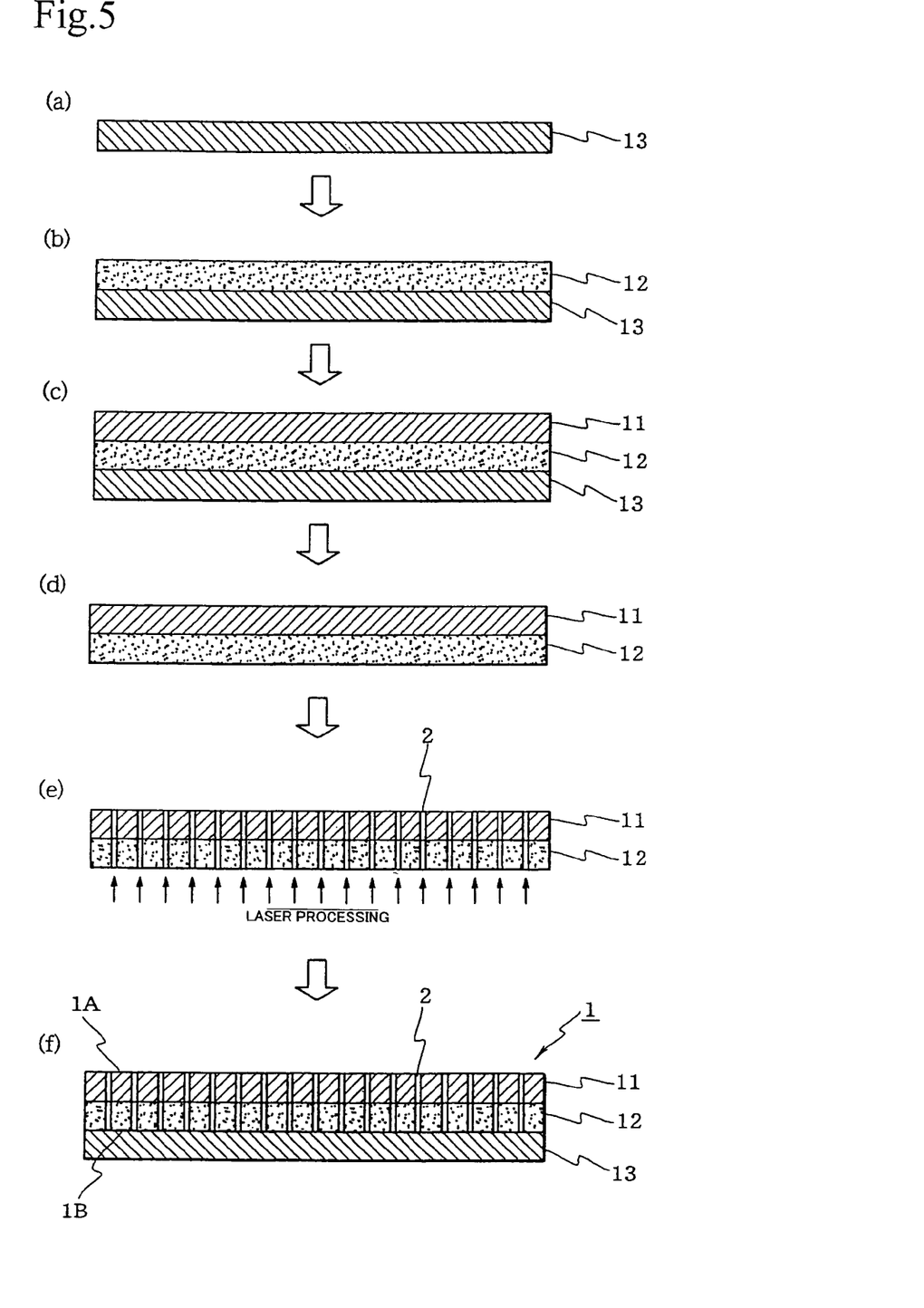
FIG. 5 consists of sectional views showing an example of a method of producing the pressure-sensitive adhesive sheet according to the embodiment of the present invention.

In the present producing method, firstly, as shown in FIGS. 5(*a*) and (*b*), the pressure-sensitive adhesive layer 12 is formed on the release treated surface of the release liner 13. The pressure-sensitive adhesive layer 12 may be formed by preparing a coating agent containing the pressure-sensitive adhesive that will constitute the pressure-sensitive adhesive layer 12, and also a solvent if desired, applying the coating agent onto the release treated surface of the release liner 13 using a coater such as a roll coater, a knife coater, a roll knife coater, an air knife coater, a die coater, a bar coater, a gravure coater, or a curtain coater, and drying.

Next, as shown in FIG. 5(*c*), the substrate 11 is superposed onto the surface of the pressure-sensitive adhesive layer 12, thus obtaining a laminate comprising the substrate 11, the pressure-sensitive adhesive layer 12, and the release liner 13. Then, as shown in FIG. 5(*d*), the release liner 13 is peeled off from the pressure-sensitive adhesive layer 12, then, as shown in FIG. 5(*e*), the through-holes 2 are formed in the laminate comprising the substrate 11 and the pressure-sensitive adhesive layer 12, and then, as shown in FIG. 5(*f*), the release liner 13 is superposed again onto the pressure-sensitive adhesive layer 12.

In the present producing method, the formation of the through-holes 2 is carried out by laser processing, the pressure-sensitive adhesive layer 12 being irradiated directly with a laser from the pressure-sensitive adhesive layer 12 side. By carrying out the laser processing from the pressure-sensitive adhesive layer 12 side in this way, even if the through-holes 2 become tapered, the diameter of the through-holes 2 can be made to be smaller on the substrate 11 side than on the pressure-sensitive adhesive layer 12 side, and hence it is easy to control the diameter of the through-holes 2 at the surface of the substrate 11 to be within the range described earlier (0.1 to 40 µm).

Moreover, by temporarily peeling off the release liner 13 and irradiating the pressure-sensitive adhesive layer 12 with the laser directly, there is no widening of the openings of each of the through-holes 2 in the pressure-sensitive adhesive layer 12 due to thermally melted matter from the release liner 13, and hence the degree of precision of the diameter and the hole density will be high, and thus through-holes 2 can be formed that will not be prone to being entered by water or the like which might have an adverse effect on the pressure-sensitive adhesive sheet 1. Furthermore, when irradiating the pressure-sensitive adhesive layer 12 with the laser, by making the release liner 13 do not present therebetween, the laser irradiation time can be shortened, or the laser output energy can be reduced. If the laser output energy is reduced, then thermal effects on the pressure-sensitive adhesive layer 12 and the substrate 11 will be reduced, and hence it will be possible to form through-holes 2 of uniform shape with little melted matter or thermal deformation.

There are no particular limitations on the type of the laser used in the laser processing; for example, a carbon dioxide ($CO_2$) laser, a TEA-$CO_2$ laser, a YAG laser, a UV-YAG laser, an excimer laser, a semiconductor laser, a $YVO_4$ laser, a YLF laser, or the like can be used.

In the present producing method, as the substrate 11, one formed by a casting method or the like using a casting sheet may be used; in this case, the casting sheet is laminated on the surface of the substrate 11. Moreover, in the present producing method, before carrying out the laser processing, a peelable protective sheet may be laminated onto the surface of the substrate (on which a casting sheet has not been laminated) 11 at a desired stage. As the protective sheet, for example a publicly known pressure-sensitive adhesive protective sheet comprising a substrate and a removable pressure-sensitive adhesive layer can be used.

When the through-holes 2 are formed through the laser processing, melted matter may become attached around the openings of the through-holes 2, but through the casting sheet or protective sheet being present on the surface of the substrate 11, the melted matter will become attached to the casting sheet or protective sheet rather than the substrate 11, and hence the appearance of the pressure-sensitive adhesive sheet 1 can be better maintained.

In the above case, when irradiating with the laser from the pressure-sensitive adhesive layer 12 side, the through-holes 2 must be formed in at least the pressure-sensitive adhesive layer 12 and the substrate 11; the through-holes 2 may formed as far as part way through the casting sheet or protective sheet, or may pass completely through the casting sheet or protective sheet.

Note that in the above producing method, the pressure-sensitive adhesive layer 12 was formed on the release liner 13, and then the substrate 11 was stuck onto the formed pressure-sensitive adhesive layer 12, but there is no limitation to this in the present invention, for example the pressure-sensitive adhesive layer 12 may be coated on the substrate 11 directly. Moreover, the laser processing may be carried out in a state with the release liner 13 laminated on, and further more their radiation with the laser may be carried out from the side of the substrate 11 or a casting sheet or protective sheet as described above.

[Use of Pressure-Sensitive Adhesive Sheet]

When sticking the pressure-sensitive adhesive sheet 1 onto an adherend, firstly the release liner 13 is peeled off from the pressure-sensitive adhesive layer 12. In the case that there is a casting sheet or protective sheet through which the through-holes 2 do not pass on the substrate 11, the casting sheet or protective sheet is peeled off. In the case that the through-holes 2 pass through such a casting sheet or protective sheet, the casting sheet or protective sheet may be peeled off at this stage, or may be peeled off after the pressure-sensitive adhesive sheet 1 has been stuck on.

Next, the pressure-sensitive adhesive surface 1B of the pressure-sensitive adhesive layer 12 that has been exposed through the release liner 13 being peeled off is made to be in close contact with the adherend, and then the pressure-sensitive adhesive sheet 1 is pressed onto the adherend. At this time, air between the adherend and the pressure-sensitive adhesive surface 1B of the pressure-sensitive adhesive layer 12 escapes from the through-holes 2 formed in the pressure-sensitive adhesive sheet 1 to the outside of the pressure-sensitive adhesive sheet front surface 1A, and hence air tends not to be caught up between the adherend and the pressure-sensitive adhesive surface 1B, i.e. air entrapment is prevented from occurring. Even if air is caught up so that air entrapment occurs, by re-pressing the air-entrapped portion or an air-entrapped portion surrounding portion including the air-entrapped portion, the air can be made to escape from the through-holes 2 to the outside of the pressure-sensitive adhesive sheet front surface 1A, thus eliminating the air entrapment. Such elimination of air entrapment is possible even after a long time has elapsed after the sticking on of the pressure-sensitive adhesive sheet 1.

Moreover, even if gas is emitted from the adherend or gas passes through the adherend after the pressure-sensitive adhesive sheet 1 has been stuck onto the adherend, this gas will escape from the through-holes 2 formed in the pressure-sensitive adhesive sheet 1 to the outside of the pressure-sensitive adhesive sheet front surface 1A, whereby the pressure-sensitive adhesive sheet 1 is prevented from blistering.

As described above, according to the pressure-sensitive adhesive sheet 1, air entrapment and blistering can be prevented or eliminated through the through-holes 2, and yet the through-holes 2, and melted portions and thermally deformed portions which may be formed along with the through-holes 2, cannot be seen with the naked eye, and hence the appearance of the pressure-sensitive adhesive sheet 1 is very good, not differing at all to that of a pressure-sensitive adhesive sheet having no through-holes 2 therein.

Following is a more detailed description of the present invention through examples and so on; however, the scope of the present invention is not limited by these examples and so on.

EXAMPLE 1

A solvent type acrylic pressure-sensitive adhesive (made by Lintec, PK) coating agent was applied using a knife coater such that the thickness after drying would be 30 μm onto the release treated surface of a release liner (made by LINTEC, FPM-11, thickness: 175 μm) obtained by laminating both surfaces of woodfree paper with a polyethylene resin and subjecting one surface to release treatment with a silicone type release agent, and drying was carried out for 1 minute at 90° C. A black opaque substrate (thickness: 100 μm) made of a polyvinyl chloride resin having a surface roughness (Ra) of 0.266 μm, a chroma ($C^*$) in the $L^*a^*b^*$ color system of 0.34 and a lightness ($L^*$) of 26.56, and a contrast ratio of 99.9% was pressed onto the pressure-sensitive adhesive layer thus formed, whereby a laminate having a three-layer structure was obtained.

The measurement of the surface roughness (Ra) was carried out in accordance with JIS B0601, using an SV-3000S4 measurement apparatus made by MITUTOYO CORPORATION with a cutoff value λc of 0.8 mm and an evaluation length ln of 10 mm. The measurement of the chroma ($C^*$) and the lightness ($L^*$) was carried out in accordance with JIS Z8729, by reflectometry using a simultaneous measurement type spectral color difference meter (made by NIPPPON DENSHOKU INDUSTRIES CO., LTD., SQ-2000) as the measurement apparatus, a white board ($L^*$=92.47, $a^*$=0.61, $b^*$=2.90) as a sample-holding stage, and a C light source with a 2° field (C/2) as a light source. The measurement of the contrast ratio was carried out in accordance with JIS K5400, using a SPECTRAFLASH SF600 plus CTC (spectrophotometer) made by Datacolor International (DCI) as the measurement apparatus. These measurement methods were the same hereinafter.

The release liner was peeled off from the laminate, and the laminate was irradiated with a $CO_2$ laser from the pressure-sensitive adhesive layer side, thus forming at a hole density of 2500 per 100 $cm^2$ through-holes having a diameter at the substrate surface of approximately 25 μm and a diameter at the pressure-sensitive adhesive surface of approximately 70 μm (the diameter being a maximum at the pressure-sensitive adhesive surface). The release liner was then superposed again onto the pressure-sensitive adhesive layer, whereby a pressure-sensitive adhesive sheet was obtained. Melted portions (maximum height: 5 μm) on the substrate surface of the pressure-sensitive adhesive sheet had an outside diameter of approximately 40 μm, and there were no thermally deformed portions.

Note that the diameters of the through-holes, melted portions and thermally deformed portions were measured using a scanning electron microscope (made by HITACHI LTD., model S-2360N) (likewise hereinafter).

EXAMPLE 2

A pressure-sensitive adhesive sheet was produced as in Example 1, except that the through-holes were made to have a diameter at the substrate surface of approximately 40 μm. Melted portions (maximum height: 3 μm) on the substrate surface of the pressure-sensitive adhesive sheet had an outside diameter of approximately 45 μm, and there were no thermally deformed portions.

EXAMPLE 3

A pressure-sensitive adhesive sheet was produced as in Example 2, except that the through-holes were made to have a diameter at the pressure-sensitive adhesive surface of approximately 120 μm. Melted portions (maximum height: 3 μm) on the substrate surface of the pressure-sensitive adhesive sheet had an outside diameter of approximately 45 μm, and there were no thermally deformed portions.

EXAMPLE 4

A pressure-sensitive adhesive sheet was produced as in Example 1, except that a UV-YAG laser was used in the laser processing, and the through-holes were made to have a diameter at the substrate surface of approximately 30 µm, and a diameter at the pressure-sensitive adhesive surface of approximately 50 µm. Melted portions (maximum height: 4 µm) on the substrate surface of the pressure-sensitive adhesive sheet had an outside diameter of approximately 35 µm, and there were no thermally deformed portions.

EXAMPLE 5

A pressure-sensitive adhesive sheet was produced as in Example 1, except that an excimer laser was used in the laser processing, and the through-holes were made to have a diameter at the substrate surface of approximately 0.1 to 10 µm, and a diameter at the pressure-sensitive adhesive surface of approximately 25 µm. There were no melted portions or thermally deformed portions on the substrate surface of the pressure-sensitive adhesive sheet.

EXAMPLE 6

A pressure-sensitive adhesive sheet was produced as in Example 5, except that the through-holes were made to have a diameter at the substrate surface of approximately 40 µm, and a diameter at the pressure-sensitive adhesive surface of approximately 65 µm. There were no melted portions or thermally deformed portions on the substrate surface of the pressure-sensitive adhesive sheet.

EXAMPLE 7

A pressure-sensitive adhesive sheet was produced as in Example 2, except that a black opaque substrate (thickness: 100 µm) made of a polyvinyl chloride resin having a surface roughness (Ra) of 0.507 µm, a chroma (C*) in the L*a*b* color system of 0.34 and a lightness (L*) of 26.58, and a contrast ratio of 98.4% was used as the substrate. Melted portions (maximum height: 3 µm) on the substrate surface of the pressure-sensitive adhesive sheet had an outside diameter of approximately 45 µm, and there were no thermally deformed portions.

EXAMPLE 8

A pressure-sensitive adhesive sheet was produced as in Example 1, except that a black opaque substrate (thickness: 100 µm) made of a polyvinyl chloride resin having a surface roughness (Ra) of 0.220 µm, a chroma (C*) in the L*a*b* color system of 0.49 and a lightness (L*) of 25.81, and a contrast ratio of 99.9% was used as the substrate, and the through-holes were made to have a diameter at the substrate surface of approximately 35 µm. Melted portions (maximum height: 4 µm) on the substrate surface of the pressure-sensitive adhesive sheet had an outside diameter of approximately 40 µm, and there were no thermally deformed portions.

EXAMPLE 9

A pressure-sensitive adhesive sheet was produced as in Example 8, except that an excimer laser was used in the laser processing, and the through-holes were made to have a diameter at the substrate surface of approximately 40 µm, and a diameter at the pressure-sensitive adhesive surface of approximately 65 µm. There were no melted portions or thermally deformed portions on the substrate surface of the pressure-sensitive adhesive sheet.

EXAMPLE 10

Using as a casting sheet a polyethylene terephthalate film (made by TEIJIN DUPONT FILMS JAPAN LIMITED, U4Z-50, thickness: 50 µm) one surface of which had been subjected to release treatment, a black opaque substrate (thickness: 55 µm) made of a polyvinyl chloride resin having a surface roughness (Ra) of 0.218 µm, a chroma (C*) in the L*a*b* color system of 0.78 and a lightness (L*) of 27.33, and a contrast ratio of 97.0% was formed using a casting method.

On the other hand, a pressure-sensitive adhesive layer was formed on a release liner as in Example 1, and then this pressure-sensitive adhesive layer and the above substrate with casting sheet were superposed together such that the pressure-sensitive adhesive layer and the opposite surface of the above substrate were attached firmly, whereby a laminate having a four-layer structure was obtained.

The release liner was peeled off from the laminate obtained, and the laminate was irradiated with a $CO_2$ laser from the pressure-sensitive adhesive layer side, thus forming at a hole density of 2500 per 100 $cm^2$ through-holes having a diameter at the substrate surface of approximately 30 µm and a diameter at the pressure-sensitive adhesive surface of approximately 70 µm (the diameter being a maximum at the pressure-sensitive adhesive surface). The release liner was then superposed again onto the pressure-sensitive adhesive layer, whereby a pressure-sensitive adhesive sheet was obtained. There were no melted portions or thermally deformed portions on the substrate surface of the pressure-sensitive adhesive sheet.

EXAMPLE 11

A black opaque substrate (thickness: 90 µm) made of a polyurethane resin having a surface roughness (Ra) of 0.211 µm, a chroma (C*) in the L*a*b* color system of 0.28 and a lightness (L*) of 25.41, and a contrast ratio of 99.9% was formed on a casting sheet as in Example 10.

A pressure-sensitive adhesive sheet was produced as in Example 10, except that the substrate with casting sheet obtained as described above was used, and the through-holes were made to have a diameter at the pressure-sensitive adhesive surface of approximately 65 µm. There were no melted portions or thermally deformed portions on the substrate surface of the pressure-sensitive adhesive sheet.

EXAMPLE 12

Using as a casting sheet woodfree paper laminated on both surfaces thereof with polyethylene (made by LINTEC, EKR90SKK, thickness: 95 µm) one surface of which had been subjected to release treatment with an alkyd type release agent, a dark red opaque substrate (thickness: 100 µm) made of a polyvinyl chloride resin having a surface roughness (Ra) of 0.273 µm, a chroma (C*) in the L*a*b* color system of 20.10 and a lightness (L*) of 34.48, and a contrast ratio of 98.1% was formed using a casting method.

A pressure-sensitive adhesive sheet was produced as in Example 10, except that the substrate with casting sheet obtained as described above was used, and the through-holes were made to have a diameter at the pressure-sensitive adhesive surface of approximately 75 µm. There were no melted portions or thermally deformed portions on the substrate surface of the pressure-sensitive adhesive sheet.

EXAMPLE 13

A red opaque substrate (thickness: 70 μm) made of a polyvinyl chloride resin having a surface roughness (Ra) of 0.218 μm, a chroma (C*) in the L*a*b* color system of 58.50 and a lightness (L*) of 54.07, and a contrast ratio of 97.7% was formed on a casting sheet as in Example 10.

A pressure-sensitive adhesive sheet was produced as in Example 10, except that the substrate with casting sheet obtained as described above was used, and the through-holes were made to have a diameter at the substrate surface of approximately 25 μm, and a diameter at the pressure-sensitive adhesive surface of approximately 60 μm. There were no melted portions or thermally deformed portions on the substrate surface of the pressure-sensitive adhesive sheet.

EXAMPLE 14

A green opaque substrate (thickness: 70 μm) made of a polyvinyl chloride resin having a surface roughness (Ra) of 0.212 μm, a chroma (C*) in the L*a*b* color system of 55.62 and a lightness (L*) of 51.84, and a contrast ratio of 98.8% was formed on a casting sheet as in Example 10.

A pressure-sensitive adhesive sheet was produced as in Example 13, except that the substrate with casting sheet obtained as described above was used. There were no melted portions or thermally deformed portions on the substrate surface of the pressure-sensitive adhesive sheet.

EXAMPLE 15

A yellow opaque substrate (thickness: 70 μm) made of a polyvinyl chloride resin having a surface roughness (Ra) of 0.230 μm, a chroma (C*) in the L*a*b* color system of 81.71 and a lightness (L*) of 79.48, and a contrast ratio of 96.8% was formed on a casting sheet as in Example 10.

A pressure-sensitive adhesive sheet was produced as in Example 13, except that the substrate with casting sheet obtained as described above was used. There were no melted portions or thermally deformed portions on the substrate surface of the pressure-sensitive adhesive sheet.

EXAMPLE 16

A pressure-sensitive adhesive layer was formed on a release liner as in Example 1, a black opaque substrate (thickness: 100 μm) made of a polyolefin type thermoplastic elastomer having a colorless transparent acrylic coating (thickness: 5 μm) on a surface thereof and having a surface roughness (Ra) of 0.373 μm, a chroma (C*) in the L*a*b* color system of 0.34 and a lightness (L*) of 27.39, and a contrast ratio of 99.3% was pressed onto the pressure-sensitive adhesive layer, and then a polyethylene film with removable pressure-sensitive adhesive layer (made by SUMIRON CO., LTD., E-212, thickness: 60 μm) was further stuck as a protective sheet onto the surface of the substrate, whereby a laminate having a four-layer structure was obtained.

The release liner was peeled off from the laminate, and the laminate was irradiated with a $CO_2$ laser from the pressure-sensitive adhesive layer side, thus forming at a hole density of 2500 per 100 $cm^2$ through-holes having a diameter at the substrate surface of approximately 20 μm and a diameter at the pressure-sensitive adhesive surface of approximately 120 μm (the diameter being a maximum at the pressure-sensitive adhesive surface). The release liner was then superposed again onto the pressure-sensitive adhesive layer, whereby a pressure-sensitive adhesive sheet was obtained. Thermally deformed portions (concave, maximum depth: 5 μm) on the substrate surface of the pressure-sensitive adhesive sheet had an outside diameter of approximately 150 μm, and there were no melted portions.

EXAMPLE 17

A pressure-sensitive adhesive layer was formed as in Example 1 on the release treated surface of a release liner (made by TOYOBO CO., LTD., Crisper G-7223, thickness: 125 μm) obtained by subjecting one surface of a polyethylene terephthalate film to release treatment with a silicone type release agent, and a black opaque substrate (made by TEIJIN CHEMICALS LTD., Ecocaru α series black film, thickness: 45 μm) comprising a polyester type thermoplastic elastomer layer (thickness: 40 μm) with an anchor coat layer (thickness: 1 μm), a black colored layer (thickness: 2 μm) and a colorless transparent acrylic coating (thickness: 2 μm) laminated thereon in this order, and having a surface roughness (Ra) of 0.040 μm, a chroma (C*) in the L*a*b* color system of 1.77 and a lightness (L*) of 26.67, and a contrast ratio of 99.9% was superposed onto the pressure-sensitive adhesive layer. A polyethylene film with removable pressure-sensitive adhesive layer (made by SUMIRON CO., LTD., E-2035, thickness: 60 μm) was then further stuck as a protective sheet onto the surface of the substrate, whereby a laminate having a four-layer structure was obtained.

The modulus of elasticity in tension of the substrate was measured in accordance with JIS K7161 and JIS K7127 under the following conditions, and was 526 MPa.

Measurement apparatus: TENSILON RTA-100 made by Orientec

Width of test piece (type 2): 15 mm

Initial inter-chuck distance: 100 mm

Test speed: 200 mm/min

The release liner was peeled off from the laminate, and the laminate was irradiated with a $CO_2$ laser from the pressure-sensitive adhesive layer side, thus forming at a hole density of 2500 per 100 $cm^2$ through-holes having a diameter at the substrate surface of approximately 20 μm and a diameter at the pressure-sensitive adhesive surface of approximately 60 μm (the diameter being a maximum at the pressure-sensitive adhesive surface). The release liner was then superposed again onto the pressure-sensitive adhesive layer, whereby a pressure-sensitive adhesive sheet was obtained. Thermally deformed portions (concave, maximum depth: 5 μm) on the substrate surface of the pressure-sensitive adhesive sheet had an outside diameter of approximately 50 μm, and there were no melted portions.

COMPARATIVE EXAMPLE 1

A pressure-sensitive adhesive sheet was produced as in Example 1, except that the through-holes were made to have a diameter at the substrate surface of approximately 60 μm, and a diameter at the pressure-sensitive adhesive surface of approximately 100 μm. There were no melted portions or thermally deformed portions on the substrate surface of the pressure-sensitive adhesive sheet.

COMPARATIVE EXAMPLE 2

A pressure-sensitive adhesive sheet was produced as in Example 1, except that the through-holes were made to have a diameter at the substrate surface of approximately 40 μm, and a diameter at the pressure-sensitive adhesive surface of approximately 85 μm. Melted portions (maximum height: 5 μm) on the substrate surface of the pressure-sensitive adhesive sheet had an outside diameter of approximately 70 μm, and there were no thermally deformed portions.

COMPARATIVE EXAMPLE 3

A pressure-sensitive adhesive sheet was produced as in Example 1, except that a black opaque substrate (thickness: 100 μm) made of a polyolefin type thermoplastic elastomer having a colorless transparent acrylic coating (thickness: 5 μm) on a surface thereof and having a surface roughness (Ra) of 0.373 μm, a chroma (C*) in the L*a*b* color system of 0.34 and a lightness (L*) of 27.39, and a contrast ratio of 99.3% was used as the substrate, and the through-holes were made to have a diameter at the substrate surface of approximately 30 μm, and a diameter at the pressure-sensitive adhesive surface of approximately 180 μm. Melted portions (maximum height: 4 μm) on the substrate surface of the pressure-sensitive adhesive sheet had an outside diameter of approximately 50 μm, and thermally deformed portions (convex, maximum height: 8 μm) had an outside diameter of approximately 220 μm.

[Test]

For each of the pressure-sensitive adhesive sheets obtained in the Examples and the Comparative Examples, an air entrapment removability test, and a hole visibility inspection (non-stretched and stretched) were carried out, and the air permeability resistance was measured as described below. The results are shown in Table 1.

Air entrapment removability test: The pressure-sensitive adhesive sheet from which any casting sheet or protective sheet had been peeled off and the release liner had been peeled off (size: 50 mm×50 mm) was stuck onto a 70 mm×70 mm melamine coated plate having therein a depression having the shape of part of a spherical surface with a diameter of 15 mm and a maximum depth of 1 mm (there was air entrapment between the depression and the pressure-sensitive adhesive sheet), and then the pressure-sensitive adhesive sheet was pressed on using a squeegee, and it was verified whether or not the air entrapment could be eliminated. Pressure-sensitive adhesive sheets for which the result was that the pressure-sensitive adhesive sheet followed the depression in the melamine coated plate and hence the air entrapment was eliminated were marked as "○", and ones for which the pressure-sensitive adhesive sheet did not follow the depression in the melamine coated plate and hence the air entrapment was not eliminated (including ones for which even a small amount of air entrapment remained) were marked as "x".

Hole visibility inspection: The pressure-sensitive adhesive sheet from which any casting sheet or protective sheet had been peeled off and the release liner had been peeled off (size: 25 mm×100 mm) was stuck onto a white melamine coated plate, and it was inspected whether or not the through-holes, melted portions or thermally deformed portions on the surface of the pressure-sensitive adhesive sheet could be seen with the naked eye under indoor fluorescent lighting. Moreover, the pressure-sensitive adhesive sheet from which any casting sheet or protective sheet and the release liner had similarly been peeled off (size of inspected portion: 25 mm×100 mm) was stretched by 3% in one direction such that the length changed from 100 mm to 103 mm, and was stuck onto a white melamine coated plate in this state, and an inspection was carried out as above. The distance from the eyes to the pressure-sensitive adhesive sheet was made to be approximately 30 cm, and the angle from which the pressure-sensitive adhesive sheet was viewed was varied. Pressure-sensitive adhesive sheets for which the result was that none of the through-holes, melted portions or thermally deformed portions could be seen were marked as "○", and ones for which any of the through-holes, melted portions or thermally deformed portions could be seen were marked as "x".

Measurement of air permeability resistance (Gurley): For the pressure-sensitive adhesive sheet from which any casting sheet or protective sheet had been peeled off and the release liner had been peeled off (size: 50 mm×50 mm), the time taken for 100 ml of air to pass through was measured using a type B Gurley's densometer made by Tozai Seiki, and this was taken as the air permeability resistance (unit: sec).

TABLE 1

| | Air entrapment removability test | Hole visibility inspection (not stretched) | Hole visibility inspection (Stretched by 3%) | Air permeability resistance (sec) |
|---|---|---|---|---|
| Example 1 | ○ | ○ | ○ | 190 |
| Example 2 | ○ | ○ | ○ | 39 |
| Example 3 | ○ | ○ | x | 29 |
| Example 4 | ○ | ○ | ○ | 95 |
| Example 5 | ○ | ○ | ○ | 1037 |
| Example 6 | ○ | ○ | ○ | 38 |
| Example 7 | ○ | ○ | ○ | 36 |
| Example 8 | ○ | ○ | ○ | 48 |
| Example 9 | ○ | ○ | ○ | 35 |
| Example 10 | ○ | ○ | ○ | 91 |
| Example 11 | ○ | ○ | ○ | 93 |
| Example 12 | ○ | ○ | ○ | 88 |
| Example 13 | ○ | ○ | ○ | 203 |
| Example 14 | ○ | ○ | ○ | 201 |
| Example 15 | ○ | ○ | ○ | 197 |
| Example 16 | ○ | ○ | x | 245 |
| Example 17 | ○ | ○ | x | 205 |
| Comparative Example 1 | ○ | x | x | 12 |
| Comparative Example 2 | ○ | x | x | 32 |
| Comparative Example 3 | ○ | x | x | 95 |

As can be seen from Table 1, for the pressure-sensitive adhesive sheets satisfying the conditions of the present invention (Examples 1 to 17), none of the through-holes, melted portions or thermally deformed portions could be seen with the naked eye, and hence the appearance was very good. Moreover, for the pressure-sensitive adhesive sheets in which the through-holes had a diameter in the substrate and the pressure-sensitive adhesive layer of not more than 85 μm (Examples 1, 2, and 4 to 15), even when stuck on stretched by a elongation of 3%, none of the through-holes, melted portions or thermally deformed portions could be seen with the naked eye, and hence the appearance was very good.

The pressure-sensitive adhesive sheet of the present invention can be favorably used in the case that air entrapment or blistering would be prone to occur with a general pressure-sensitive adhesive sheet, for example in the case that the pressure-sensitive adhesive sheet has a large area, or the case that gas is emitted from the adherend, and moreover it is required that through-holes, melted portions and thermally deformed portions cannot be seen.

The invention claimed is:

1. A pressure-sensitive adhesive sheet comprising a substrate having a surface roughness (Ra) of not less than 0.03 μm, a lightness (L*) in the L*a*b* color system of not more than 60 in the case of having a chroma (C*) of not more than 60 and a lightness (L*) of not more than 85 in the case of having a chroma (C*) greater than 60, and a contrast ratio of not less than 90%, and a pressure-sensitive adhesive layer, the pressure-sensitive adhesive sheet wherein:

the pressure-sensitive adhesive sheet is formed with a plurality of through-holes passing through from one surface to the other surface thereof at a hole density of from 30 to 50,000 per 100 cm$^2$ through laser processing;

said through-holes have a diameter in said substrate and said pressure-sensitive adhesive layer of from 0.1 to 150 μm;

said through-holes have a diameter at a surface of said substrate of from 0.1 to 42 μm;

melted portions formed by the laser around said through-holes at the surface of said substrate have an outside diameter of not more than 50 μm; and thermally deformed portions formed by the laser around said through-holes or around said melted portions at the surface of said substrate have an outside diameter of not more than 180 μm.

2. The pressure-sensitive adhesive sheet according to claim 1, wherein the pressure-sensitive adhesive sheet is stuck onto an adherend stretched by a elongation of up to 3%, said substrate has a surface roughness (Ra) of not less than 0.1 μm, and said through-holes have a diameter in said substrate and said pressure-sensitive adhesive layer of from 0.1 to 85 μm.

3. The pressure-sensitive adhesive sheet according to claim 1 or 2, wherein the diameter of said through-holes at the surface of said substrate is less than the diameter of said through-holes at a pressure-sensitive adhesive surface of said pressure-sensitive adhesive layer.

* * * * *